(12) United States Patent
Huang

(10) Patent No.: US 8,408,521 B2
(45) Date of Patent: Apr. 2, 2013

(54) TENSIONING APPARATUS

(75) Inventor: Han-Ching Huang, Changhua County (TW)

(73) Assignee: Yeu Yueh Enterprise Co., Ltd., Siansi Township, Changhua County (TW)

( * ) Notice: Subject to any disclaimer, the term of this patent is extended or adjusted under 35 U.S.C. 154(b) by 337 days.

(21) Appl. No.: 12/781,643

(22) Filed: May 17, 2010

(65) Prior Publication Data
US 2010/0295004 A1  Nov. 25, 2010

Related U.S. Application Data

(63) Continuation-in-part of application No. 12/470,536, filed on May 22, 2009, now abandoned.

(51) Int. Cl.
*B21F 9/00* (2006.01)
*B66F 3/00* (2006.01)

(52) U.S. Cl. ....... 254/218; 254/223; 254/239; 24/69 ST; 24/71 ST

(58) Field of Classification Search .......... 254/217, 254/218, 223, 238, 239; 24/68 R, 69 ST, 24/69 CT, 71 ST, 71.1
See application file for complete search history.

(56) References Cited

U.S. PATENT DOCUMENTS

| | | | | | |
|---|---|---|---|---|---|
| 5,611,520 | A | * | 3/1997 | Soderstrom | 254/218 |
| 6,102,371 | A | * | 8/2000 | Wyers | 254/218 |
| 7,100,901 | B2 | * | 9/2006 | Gleinser | 254/218 |
| 7,100,902 | B1 | * | 9/2006 | Lu | 254/218 |
| 7,296,326 | B2 | | 11/2007 | Madachy et al. | |
| 7,766,271 | B1 | * | 8/2010 | Confoey | 242/395 |
| 7,854,043 | B2 | * | 12/2010 | Wang | 24/68 CD |
| 8,037,580 | B2 | * | 10/2011 | Huang | 24/68 CD |
| 8,172,203 | B2 | * | 5/2012 | Chou | 254/225 |

* cited by examiner

*Primary Examiner* — Emmanuel M Marcelo
(74) *Attorney, Agent, or Firm* — Muncy, Geissler, Olds & Lowe, PLLC

(57) ABSTRACT

A tensioning apparatus includes a first shaft and a strap wound on the first shaft such that the strap has first and second portions extending in opposite directions, and the first portion of the strap is collected on the first shaft by operably moving the rotating shaft. The tensioning apparatus further includes a reeling device for collecting the second portion of the strap. Furthermore, the reeling device includes a ratcheting mechanism that facilitates collection of the strap.

17 Claims, 16 Drawing Sheets

TENSIONING APPARATUS

CROSS REFERENCE TO RELATED APPLICATIONS

The present application is a continuation-in-part of U.S. application Ser. No. 12/470,536 entitled TENSIONING APPARATUS FOR STRAP filed on May 22, 2009 now abandoned, the disclosure of which is incorporated herein by reference.

BACKGROUND OF THE INVENTION

1. Field of the Invention

The present invention relates generally to a tensioning apparatus, and more particularly, to a tensioning apparatus for a strap.

2. Description of the Related Art

U.S. Pat. No. 7,296,326 shows a tensioning apparatus including a reeling device. The reeling device is rotatably mounted between two sidewalls of a lever. The reeling device includes a shaft and a slot therein and two knobs connected to proximal and distal ends of the shaft respectively. A user can insert the end of the strap through the slot of the shaft and turn the knob to wind the strap on the shaft. Furthermore, the user generally grips the shaft to operably move the lever. However, when the strap is collected on the shaft, the strap would obstruct user to operate the grip. Another problem is that when the user turns the knob in a direction to wind the strap, it sometimes happens that the knob is liable to turn in an opposite direction to unwind the strap.

SUMMARY OF THE INVENTION

The primary objective of the present invention is to provide a tensioning apparatus, which can obviate or at least alleviate the problems encountered in the prior art.

The foregoing objective of the present invention is attained by the tensioning apparatus composed of a frame, a first shaft rotatably mounted on the frame, and a lever connected with the first shaft and operably pivoting with respect to the frame to rotate the first shaft. Additionally, the lever further includes a gripping portion mounted thereon and used for pivoting the lever. A reeling device includes a second shaft rotatably mounted on the lever. Further, a ratcheting mechanism includes a ratchet member mounted on the second shaft and rotated with the second shaft, a pawl operably moveable between a first position in engagement with the ratchet member and a second position disengaging from the ratchet member, and an elastic element having a first end mounted on the lever and a second end connected with the pawl for biasably engaging the pawl with the ratchet member. Furthermore, a strap is inserted through the first shaft and includes first and second portions extending in opposite directions, with the first shaft rotatable to collect the first portion of the strap, and with the reeling device rotatable to collect the second portion of the strap.

DETAILED DESCRIPTION OF PREFERRED EMBODIMENTS

Figure 1:
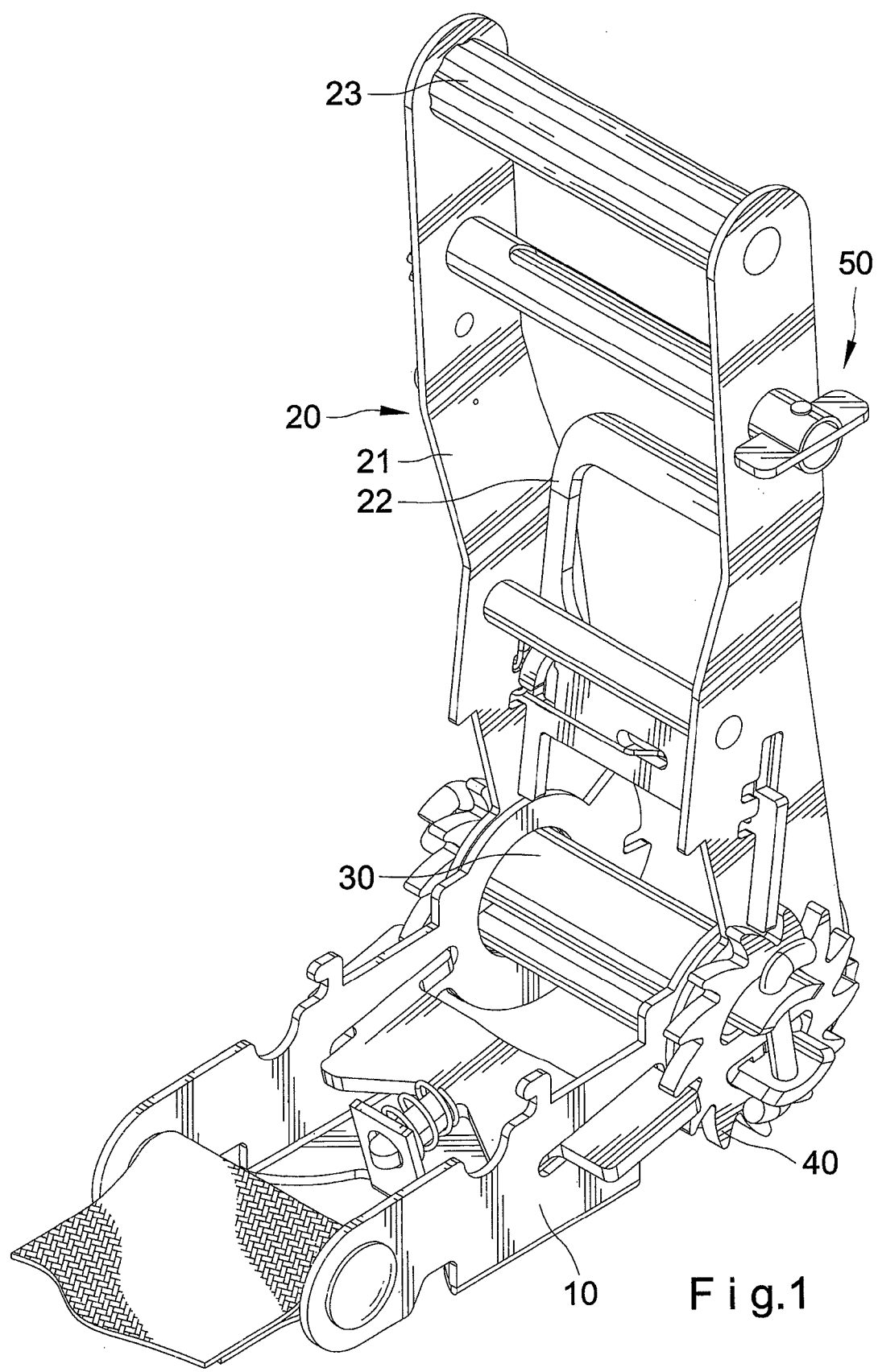
FIG. 1 is a perspective view of a first preferred embodiment of the present invention.
Figure 2:
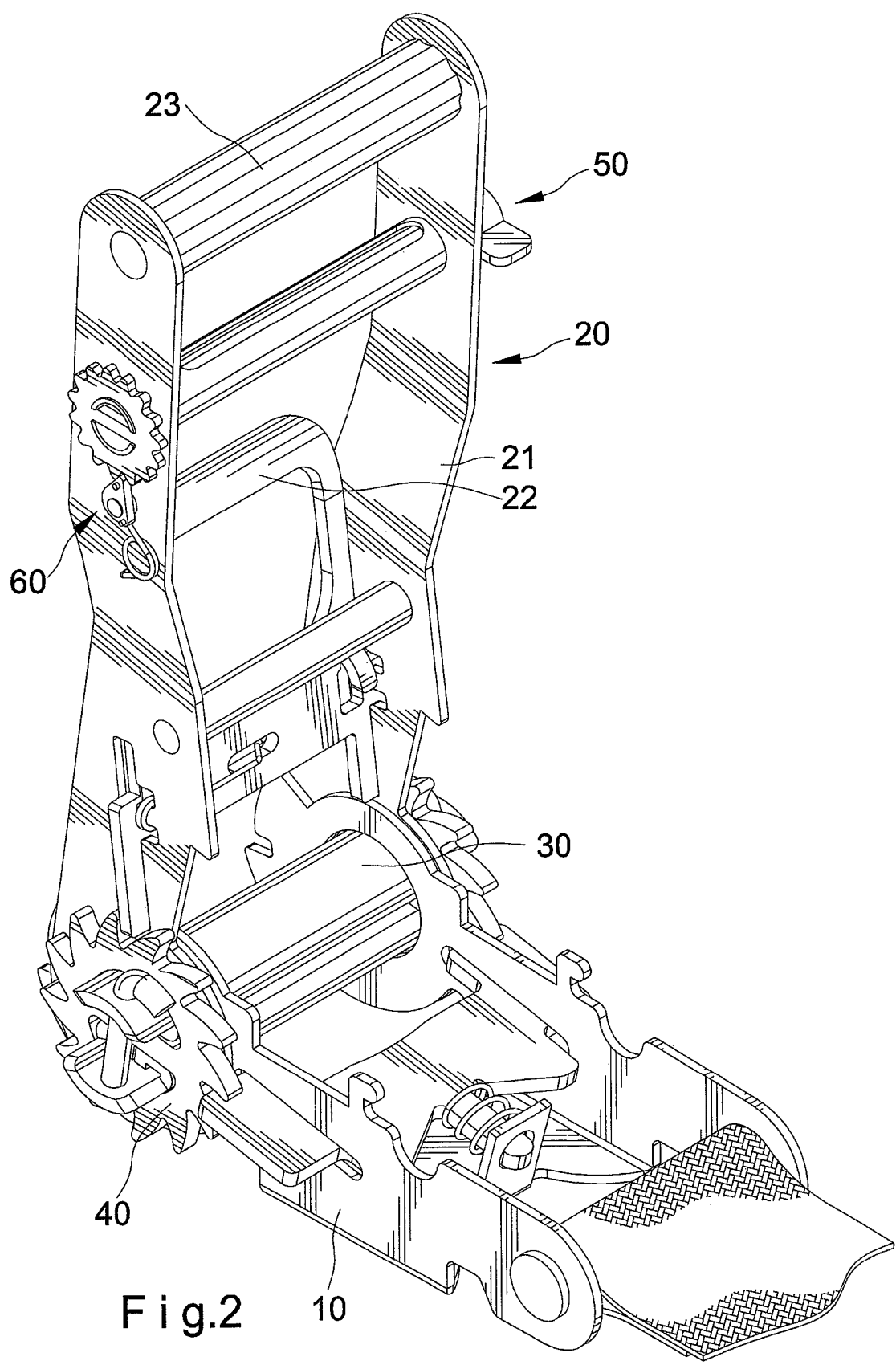
FIG. 2 is another perspective view of the first preferred embodiment of the present invention, taken in a different angle from that of FIG. 1.

FIGS. 1 and 2 show a tensioning apparatus in accordance with a first preferred embodiment of the present invention. The tensioning apparatus includes a frame 10, a lever 20, and a first shaft 30 received by the frame 10 and the lever 20. The first shaft 30 is rotatable on the frame 10 by pivoting the lever 20 with respect to the frame 10. Two ratchet wheels 40 are connected to the first shaft 30. Additionally, the two ratchet wheels 40 are rotatable with the first shaft 30 as the lever 20 pivots.

Figure 4:
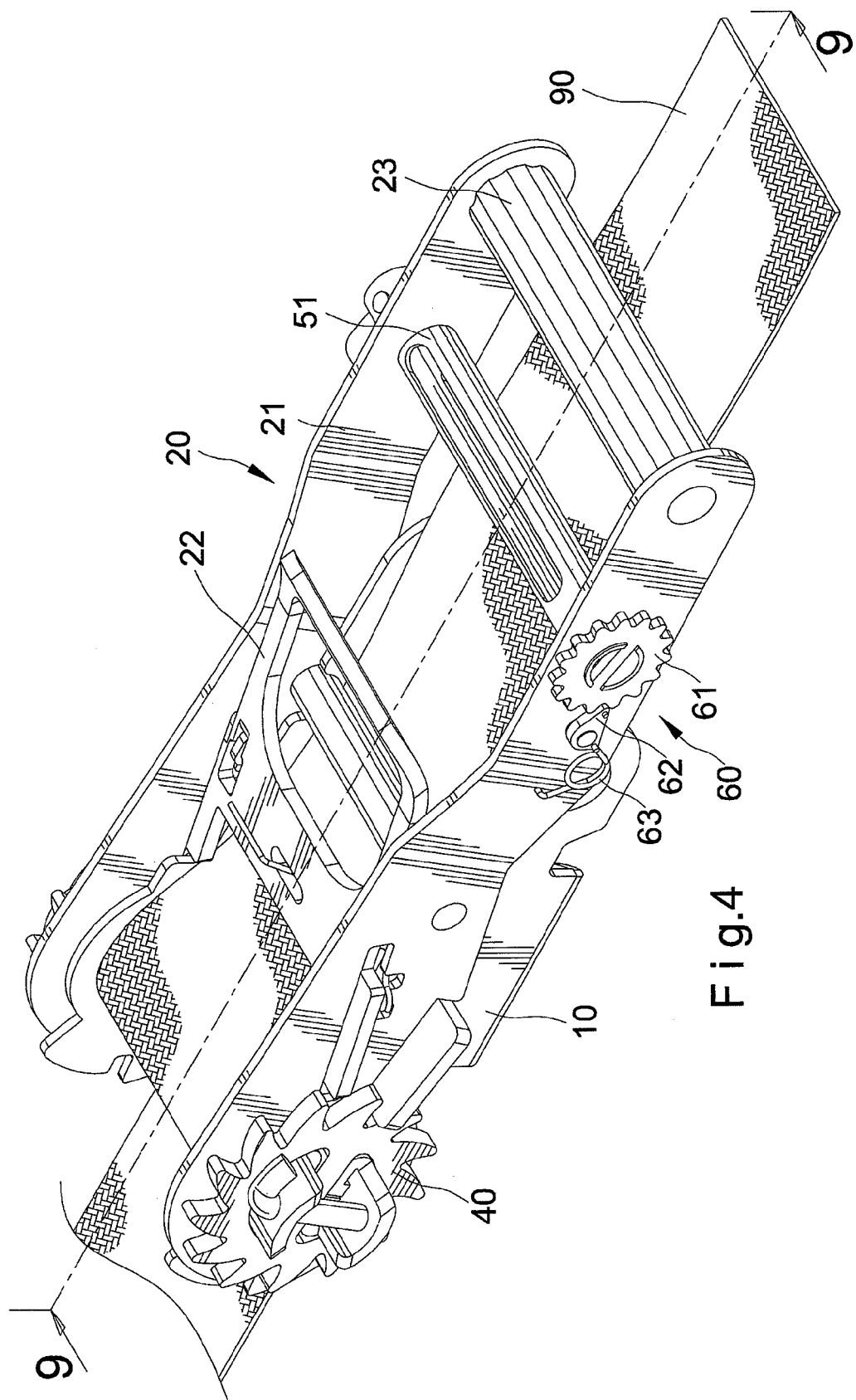
FIG. 4 is a perspective view of the first preferred embodiment of the present invention, showing a strap wound on a first shaft and with two portions extending oppositely.
Figure 5:
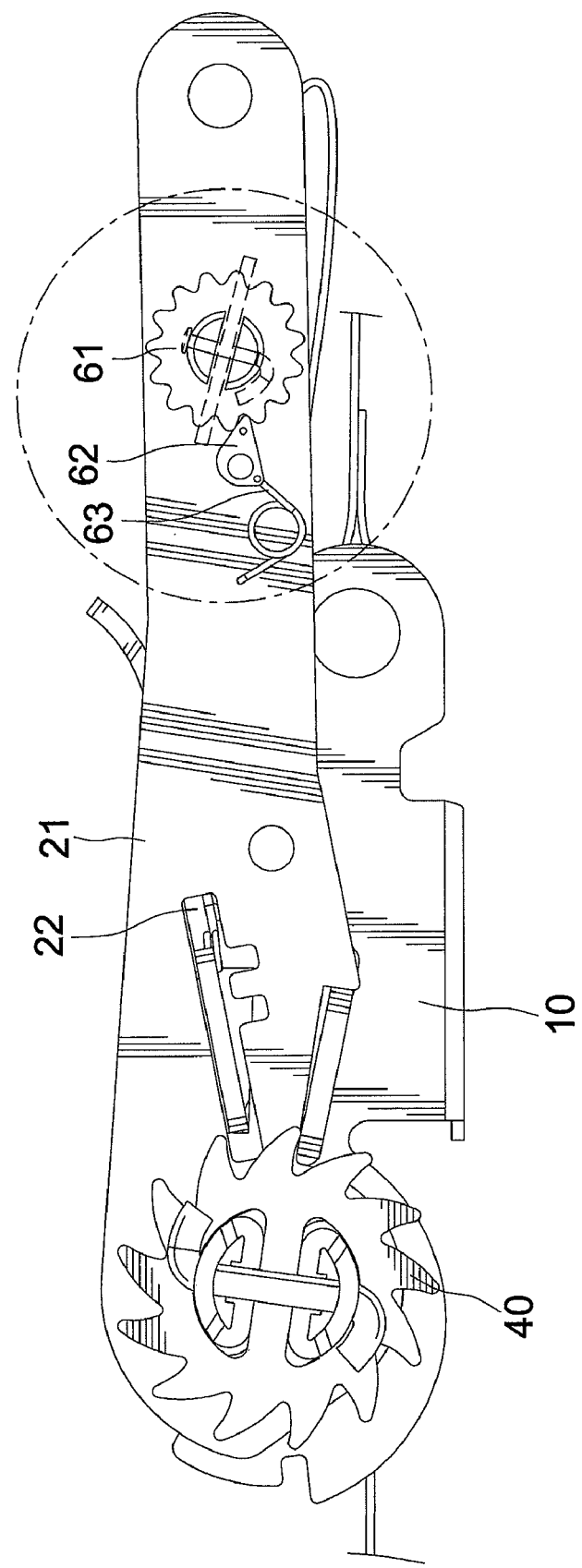
FIG. 5 is a side view of the tensioning apparatus shown in FIG. 4.
Figure 9:
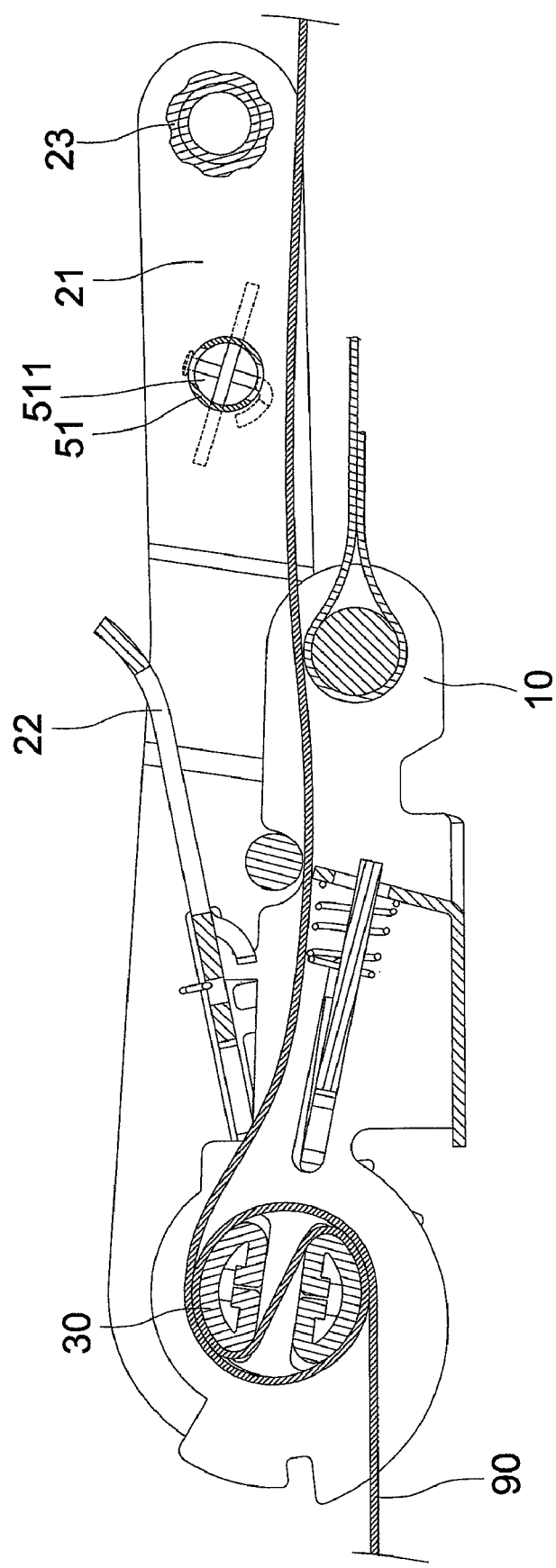
FIG. 9 is a sectional view taken along a line 9-9 indicated in FIG. 4.

The lever 20 includes a pair of cams 21 spaced from each other. The first shaft 30 is installed between the cams 21 and interconnects the cams 21. A gripping portion 23 is installed between the cams 21 and interconnects the cams 21, for pivoting the lever 20. Additionally, a detent 22 is movably installed on the lever 20 and is moveable between an operative position, in which the ratchet wheels 40 is engaged with detent 22 in order to rotate the first shaft 30, and an idle position, in which is the detent 22 is away from the ratchet wheels 40.

Where the tensioning apparatus is adapted to tension a strap 90, the strap 90 is inserted through the first shaft 30 to include a first portion and a second portion, both of which extend in opposite directions respectively, as shown in FIG. 4 or 9. It is understood that the first portion of the strap 90 is adapted to be collected on the first shaft 30 by reciprocally pivoting the lever 20. Additionally, FIG. 9 shows that the lever 20 is in a stowed position after finishing collecting the strap 90.

Figure 3:
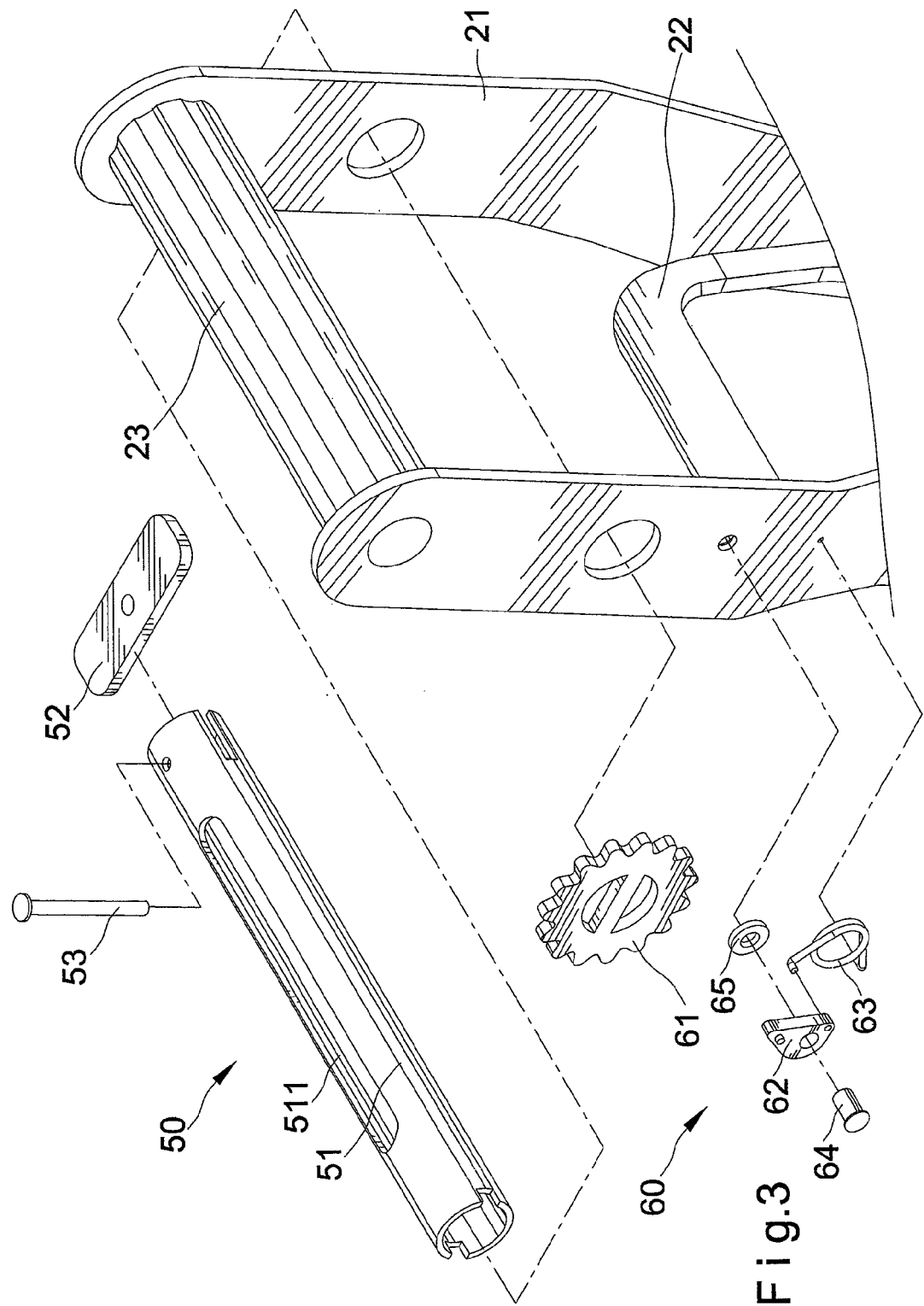
FIG. 3 is a partially exploded view of the first preferred embodiment of the present invention, showing a reeling device and a ratcheting mechanism.

The tensioning apparatus further includes a reeling device 50 for collecting the second portion of the strap 90 and a ratcheting mechanism 60. The reeling device 50 is installed between the cams 21 and interconnects the cams 21. The ratcheting mechanism 60 is installed on one of the cams 21. FIG. 3 shows that the reeling device 50 includes a second shaft 51, and the user can operably rotate the second shaft 51. The second shaft 51 is installed between the cams 21. In this preferred embodiment, the second shaft 51 is disposed between the gripping portion 23 and the detent 22. The reeling device 50 may include a handle 52 connected to the second shaft 51 for facilitating user to rotate the second shaft 51. Additionally, the handle 52 is preferably disposed outside a space delimited between the cams 21, so that user can easily operate the handle 52. Also, a fastener 53 may be used to secure the handle 52 to the second shaft 51. Furthermore, the second shaft 51 may include a slot 511 for facilitating the second portion of the strap 90 to be mounted to the second shaft 51.

Figure 6:
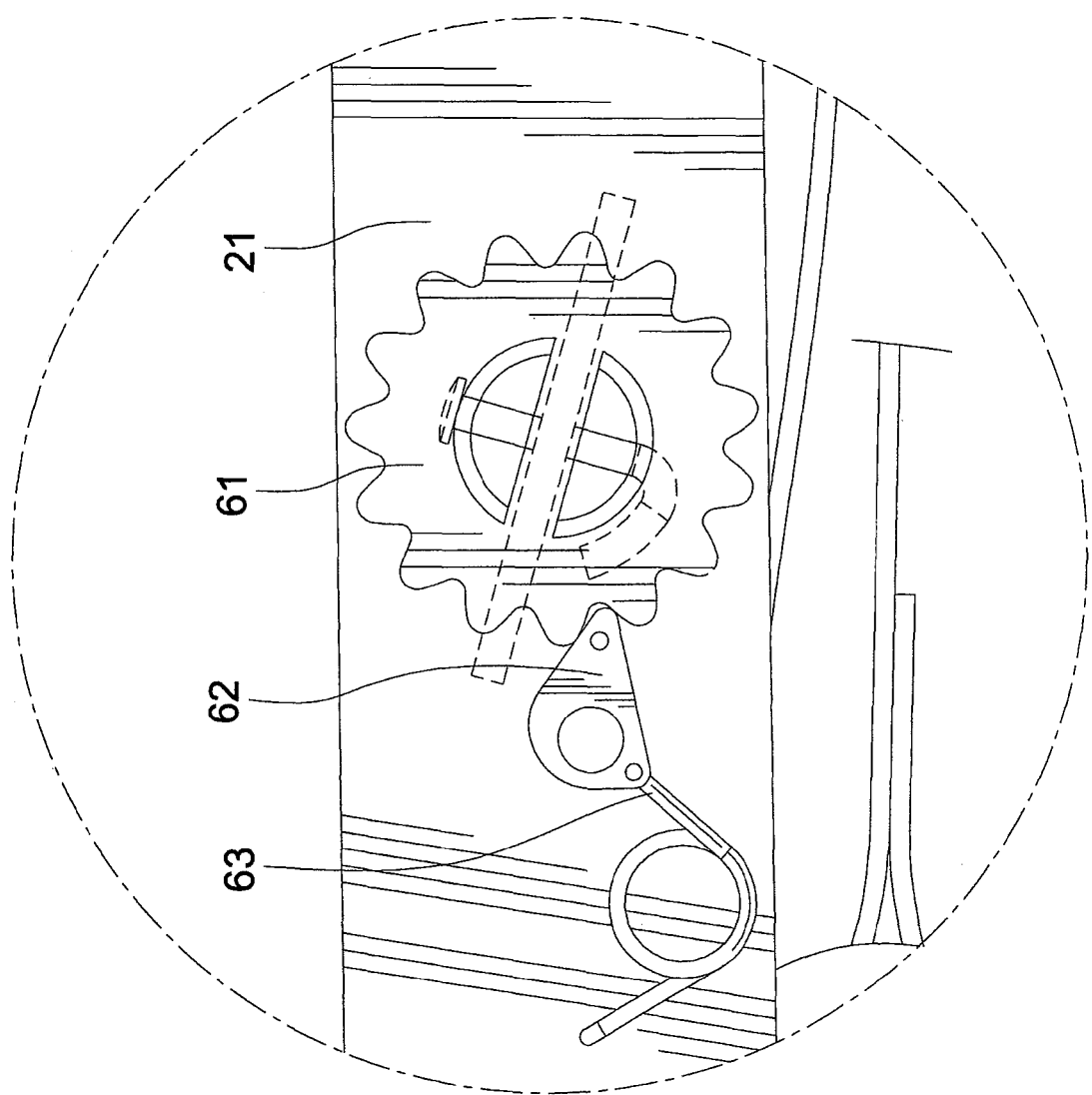
FIG. 6 is a partially enlarged view of FIG. 5
Figure 7:
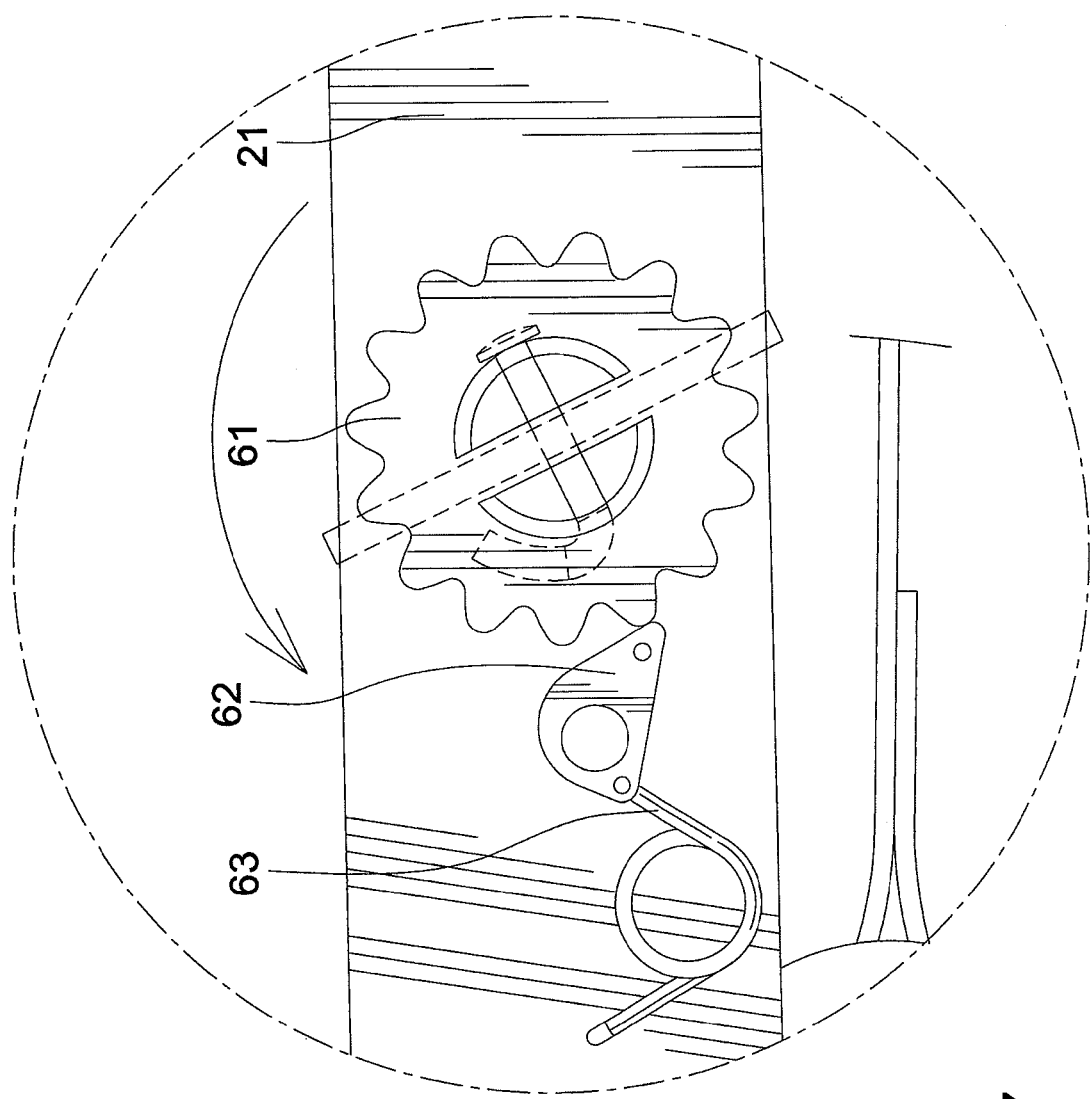
FIG. 7 an extended view of FIG. 5, showing the operational movement of the reeling device and the ratcheting mechanism.

FIG. 3 also shows that the reeling device 60 includes a ratchet member 61, a pawl 62, and an elastic element 63. The ratchet member 61 includes a plurality of teeth. Additionally, the ratchet member 61 is mounted on the second shaft 51 and can be rotated along with the second shaft 51 as the second shaft 51 is rotated. The pawl 62 is engaged in the space between two of the teeth of the ratchet member 61, as shown in FIG. 6. FIG. 6 also shows that the elastic element 63 has one end mounted on the cam 21 and the other end connected with the pawl 62. Thus, when the ratchet member 61 is rotated, the pawl 62 disengages from the space and is biasably urged by the elastic element 63 to engage in the space between another two of the teeth of the ratchet member 61, as shown in FIG. 7. Further, the pawl 62 is securely mounted on the cam 21 by a connector 64. Furthermore, a spacer 65 may be used between the pawl 62 and the cam 21.

Figure 8:
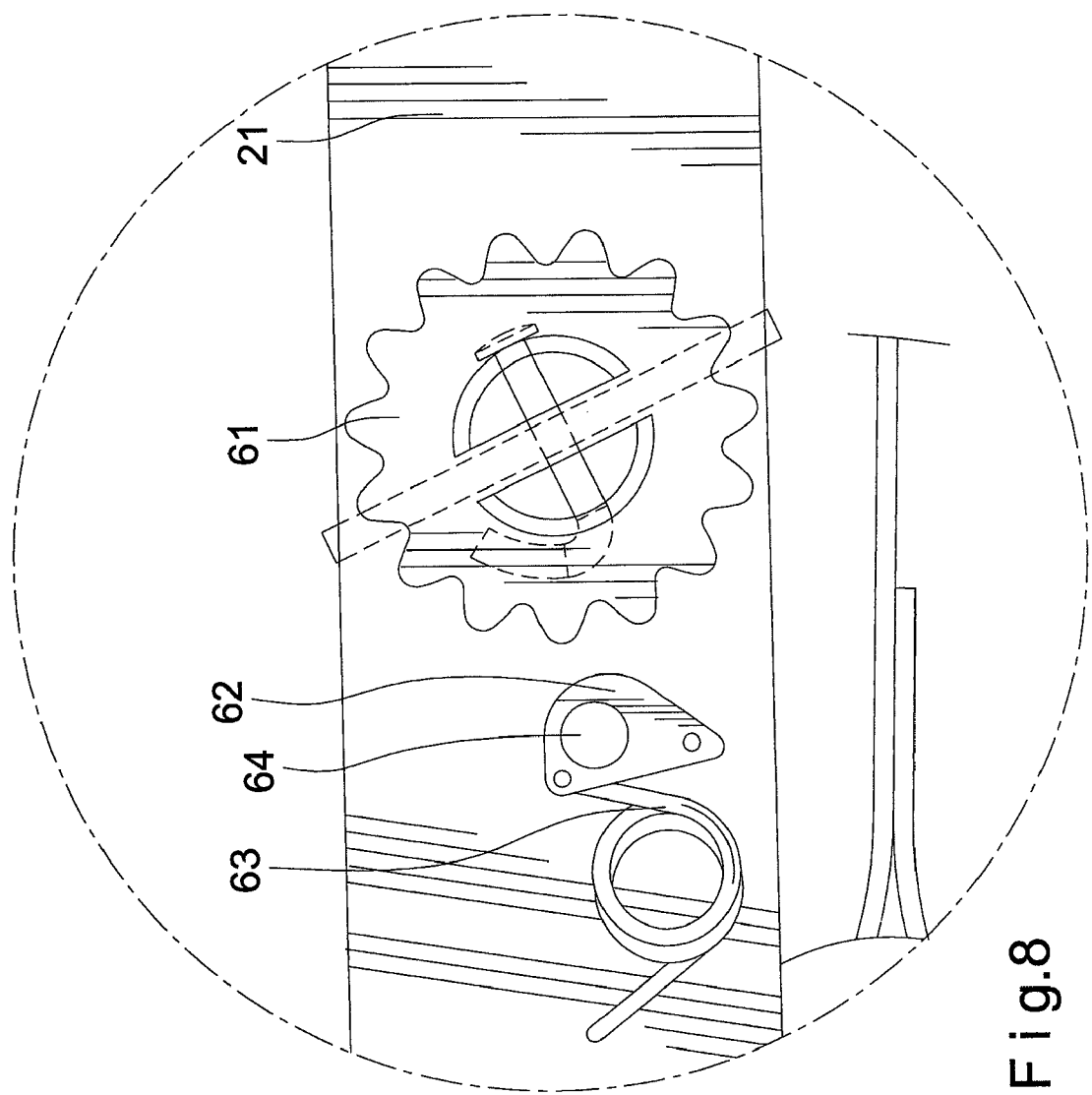
FIG. 8 an extended view of FIG. 5, illustrating that the ratcheting mechanism disengages from the reeling device.

FIG. 8 shows that the pawl 62 is retained at a position that it disengage from the ratchet member 61. Under this circumstance, the user can unreel the second portion of the strap 90 collected on the reeling device 50.

Figure 10:
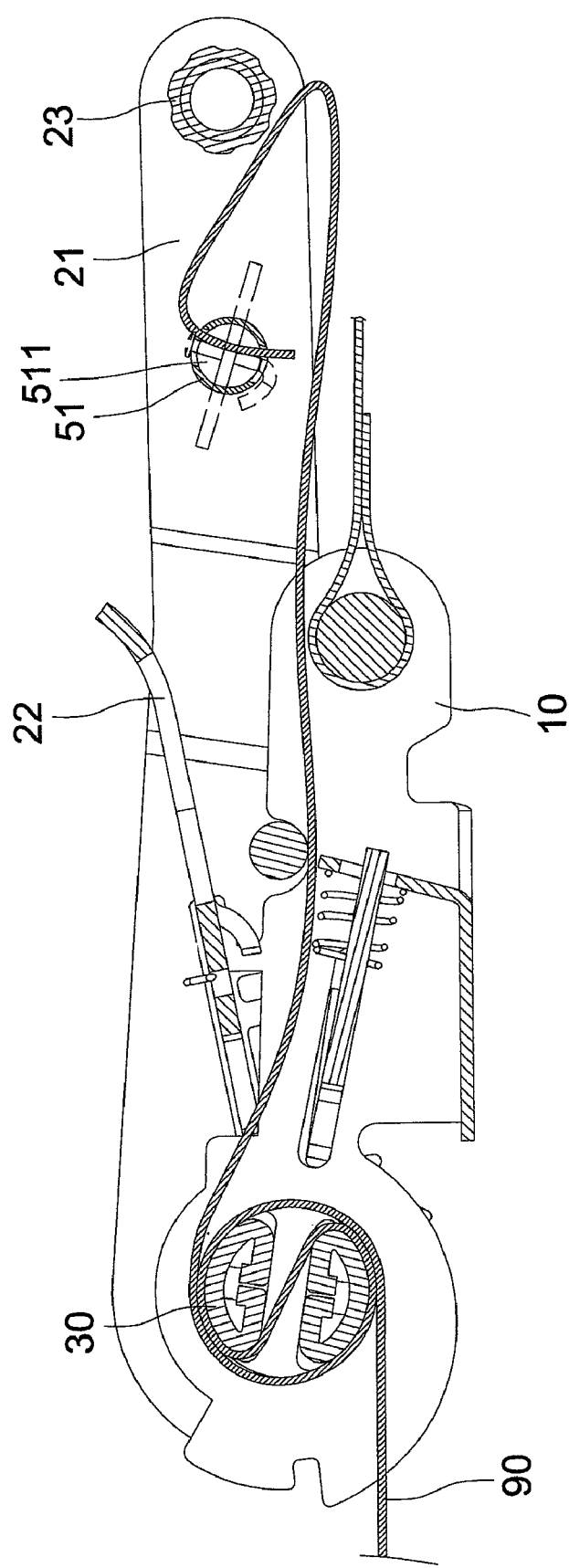
FIG. 10 an extended view of FIG. 9, illustrating that the strap is receivable by the reeling device.
Figure 11:
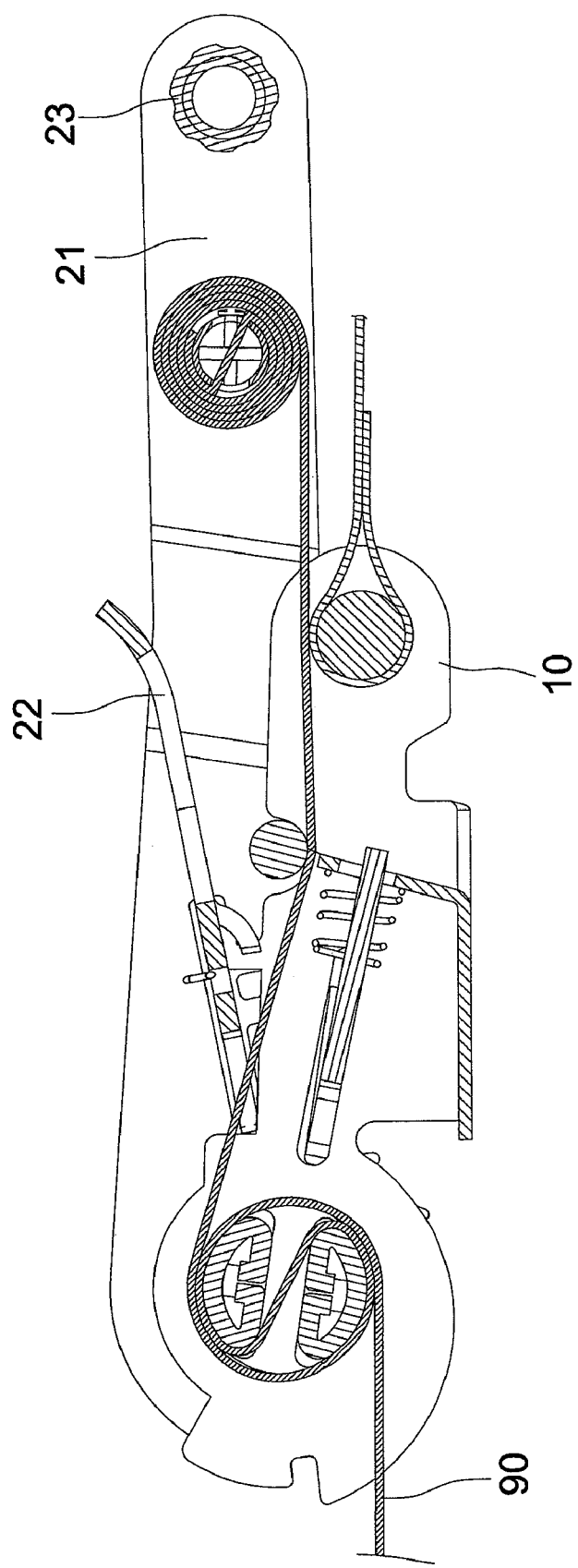
FIG. 11 is an extended view of FIG. 10, illustrating that the strap is collected on the reeling device.

Referring to FIGS. 9-11, when collecting the second portion of the strap 90, the strap 90 is inserted through the slot 511, and the strap 90 is collected on the second shaft 51 of the reeling device 50 by operating the handle 52 to rotate the second shaft 51.

It is an aspect of the present invention that the reeling device 50 is used for collecting the second portion of the strap 90.

It is another aspect of the present invention that the gripping portion 23 of the lever 20 is used to pivot the lever 20, and the strap 90 on the reeling device 50 will not interfere with the user's holding of the gripping portion 20.

It is a further aspect of the present invention that the ratcheting mechanism 60 facilitates collection of the second portion of the strap 90 by preventing the second shaft 51 from turning in a direction to unreel the strap 90.

Figure 12:
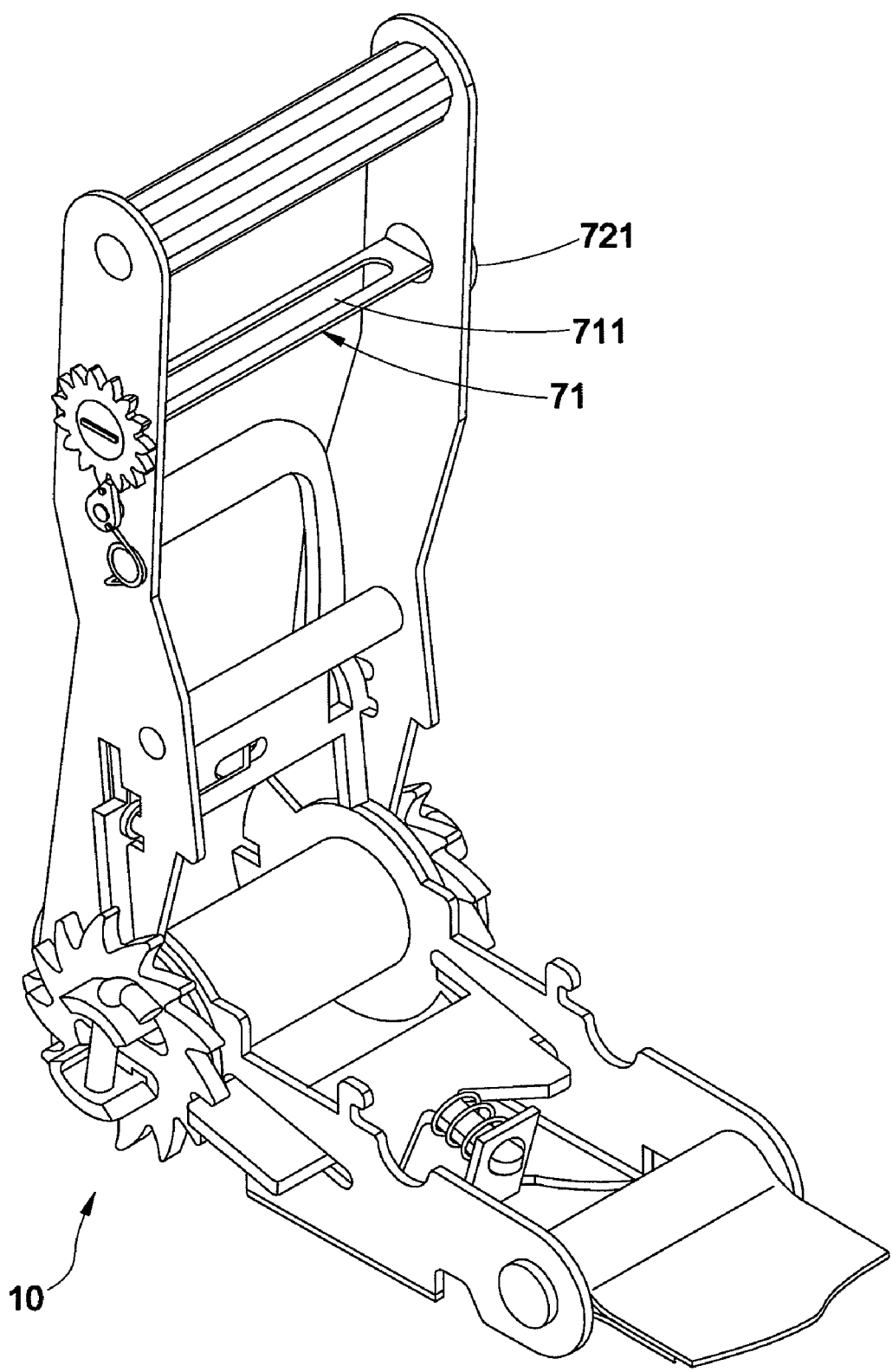
FIG. 12 is a perspective view of a second preferred embodiment of the present invention.
Figure 13:
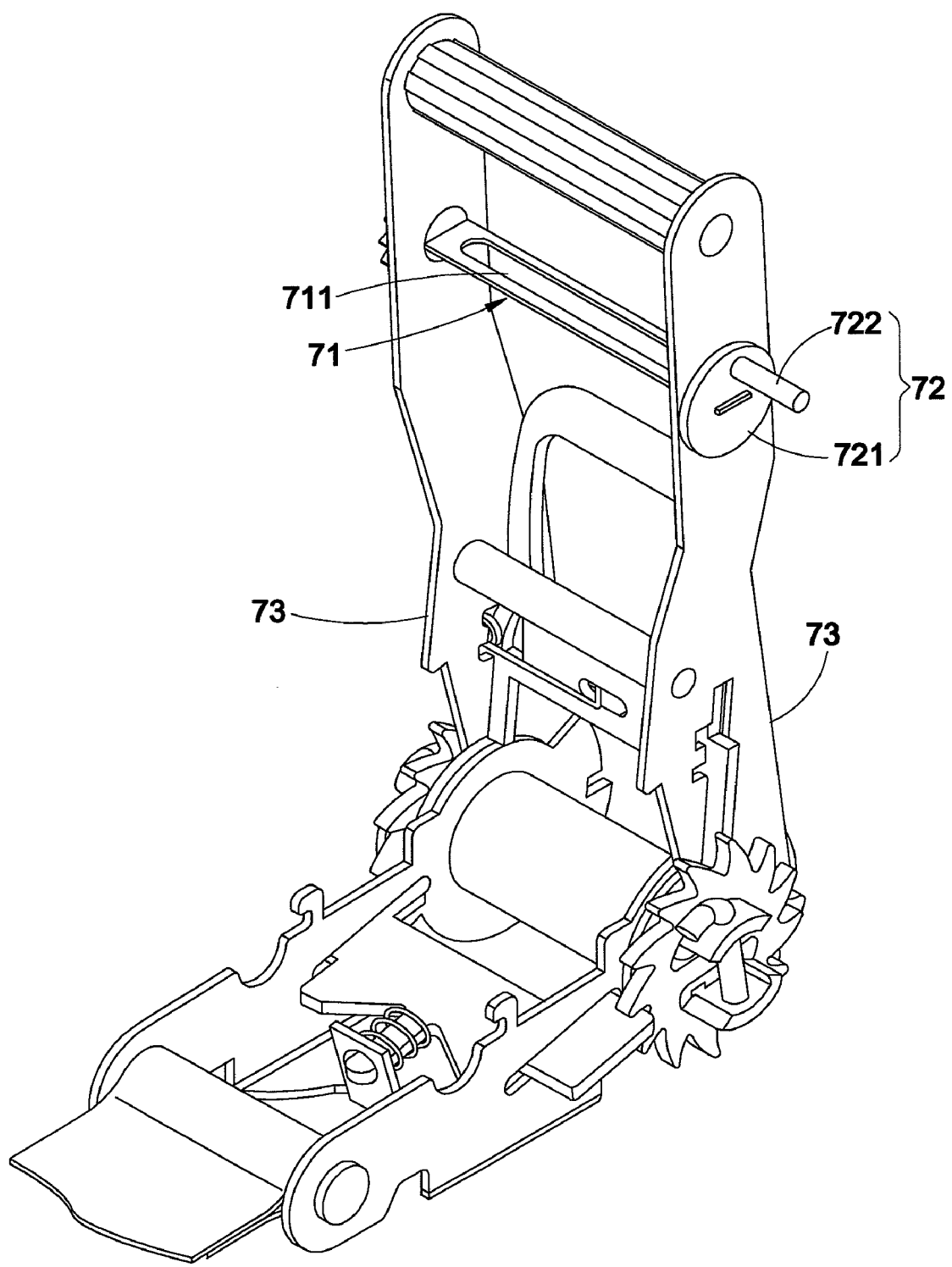
FIG. 13 is another perspective view of the second preferred embodiment of the present invention, taken in a different angle from that of FIG. 1.

Referring to FIGS. 12-13, a tensioning apparatus 70 in accordance with a second preferred embodiment of the present invention is similar to that of the first embodiment, having the following differences recited in the respective paragraphs.

The second shaft 71 is plate-shaped and includes a predetermined width at one of two sides of the slot 711.

The handle 72 is composed of a knob 721 and a grip 722. The knob 721 is connected with one end of the second shaft 71 and located outside a space between the two cams 73. The grip 722 is located on the knob 721 and spaced from an axis of the second shaft 71 for a predetermined interval for the user to hold. When the grip 722 is operated, a torque is generated with respect to the axis of the second shaft 71 to drive rotation of the second shaft 71. The plate-shaped second shaft 71 with the predetermined widths can prolong a single-loop length of the second portion of the strap 90 collected on the second shaft 71 to facilitate the collection.

Figure 14:
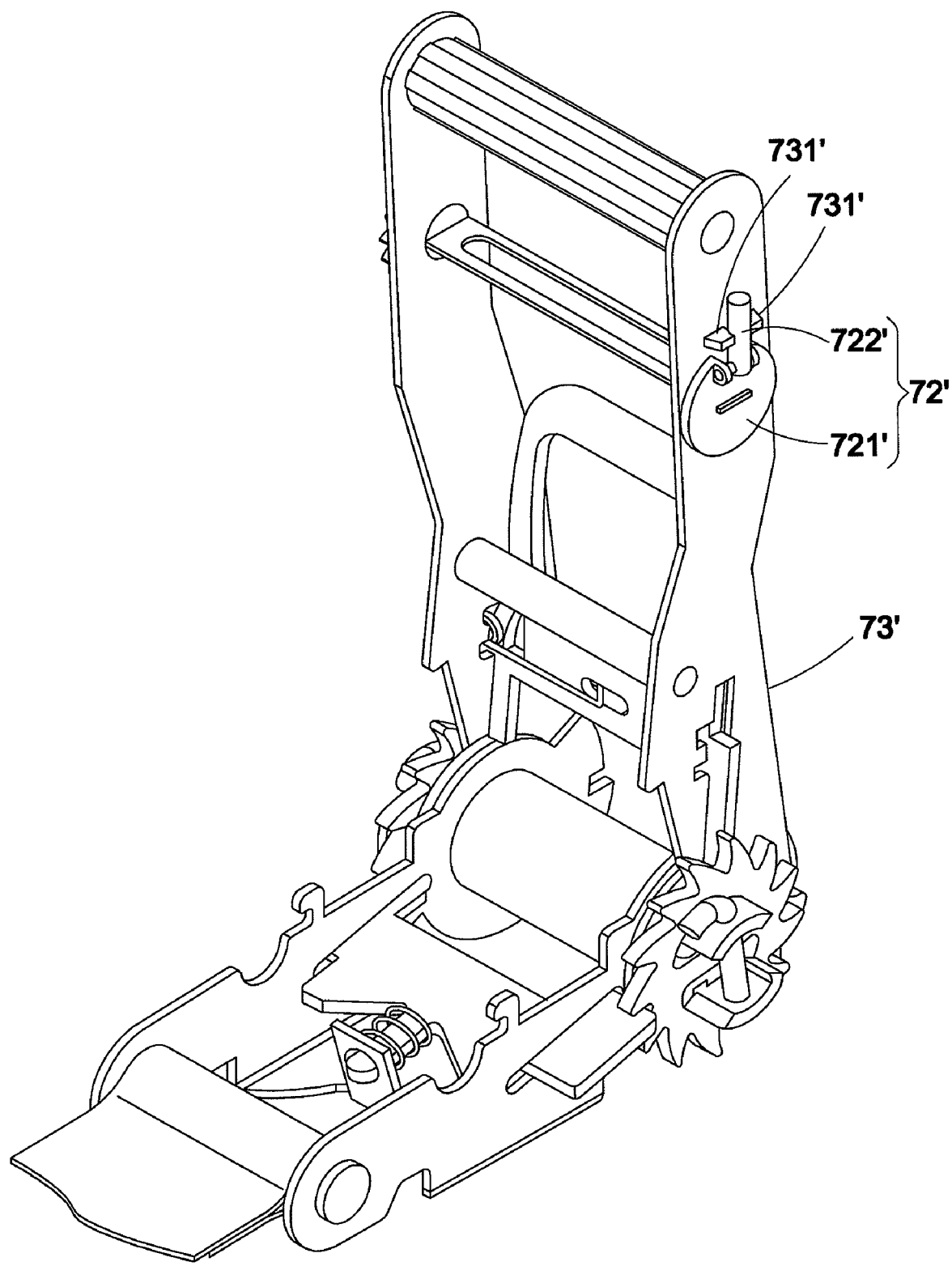
FIG. 14 is another perspective view of the second preferred embodiment of the present invention, showing an alternative status of a grip.

The grip 722 shown in FIG. 13 is fixed to the knob 721 as an example and can be alternatively connected with the knob 721. Referring to FIG. 14, the grip 722' is pivoted to the knob 721'. The cam 73' close to the handle 72' includes two lugs 731' formed on a surface thereof. When the grip 722' pivots to hug the cam 73', the grip 722' engages in a space between the two lugs 731' and meanwhile, the grip 722' is not ready for operation. When it is intended to operate the grip 722', the grip 722' can pivot to be away from and perpendicular to the knob 721' for the user's hand to hold for operation.

The other structures of the second embodiment and the effects they can make are identical to those of the first embodiment, such that more recitation is skipped.

Figure 15:
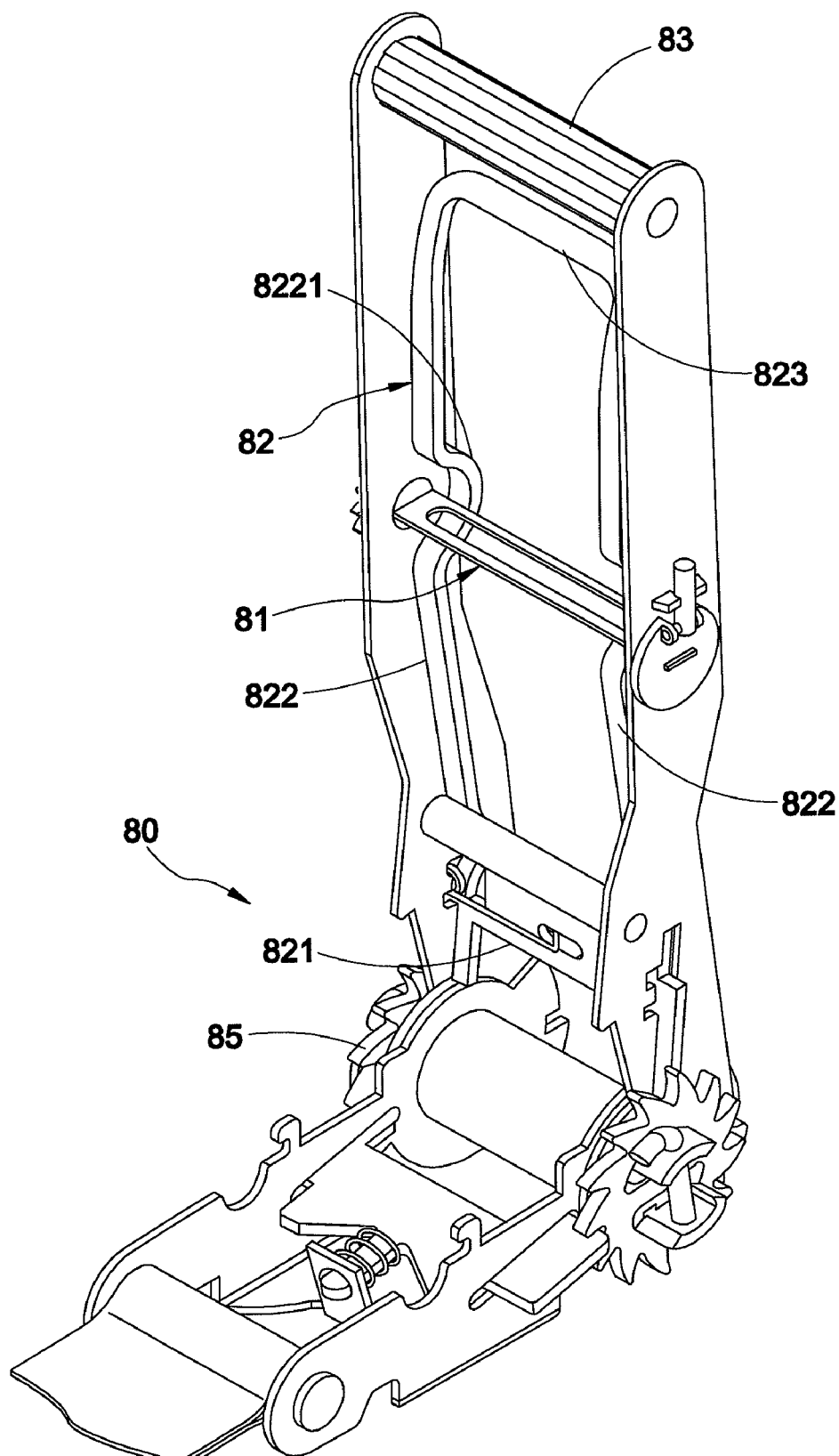
FIG. 15 is a perspective view of a third preferred embodiment of the present invention.
Figure 16:
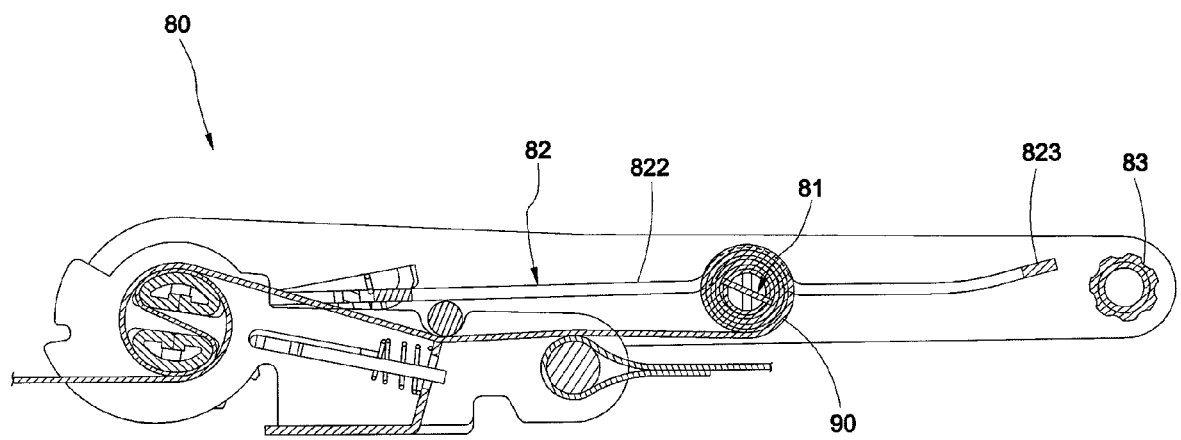
FIG. 16 is a perspective view of the third preferred embodiment of the present invention in action, illustrating the strap is collected on a second shaft.

Referring to FIGS. 15-16, a tensioning apparatus 80 in accordance with a third preferred embodiment of the present invention is similar to that of the first embodiment, having the following differences recited in the respective paragraphs.

The detent 82 includes a retaining portion 821 for engaging and disengaging from the ratchet wheel 85, two lateral strips 822 extending toward the gripping portion 83 from two sides of the retaining portion 821, and an operation portion 823 having two sides each connected with one of two distal ends of the lateral strips 822. The operation portion 823 is located between the gripping portion 83 and the second shaft 81. In this embodiment, each of the lateral strips 822 has a bended portion 8221. The bended portions 8221 allows the lateral strips 822 to circumvent the second shaft 81 toward the gripping portion 83. Besides, the second portion of the strap 90 collected on the second shaft 81 is located between the two lateral strips 822.

In light of the above, the operation portion 823 is close to the gripping portion 83, such that when the user holds the gripping portion 83, the user can easily open his or her hand to use the finger to operate the operation portion 823 for controlling the detent 82. Besides, the second portion of the strap 90 collected on the second shaft 81 can be retained by the two lateral strips 822, such that the second portion of the strap 90 can be more accurately wound on the second shaft 81 without skewness.

The other structures of the third embodiment and the effects they can make are identical to those of the first embodiment, such that more recitation is skipped.

Although the present invention has been described with respect to specific preferred embodiments thereof, it is in no way limited to the specifics of the illustrated structures but changes and modifications may be made within the scope of the appended claims.

What is claimed is:

1. A tensioning apparatus comprising:
   a frame;
   a first shaft rotatably mounted on the frame;
   a lever connected with the first shaft and operably pivoting with respect to the frame to rotate the first shaft, the lever having a gripping portion mounted thereon and used for pivoting the lever;
   a reeling device having a second shaft rotatably mounted on the lever;
   a ratcheting mechanism having a ratchet member mounted on the second shaft and rotated with the second shaft, a pawl, and an elastic element biasably engaging the pawl with the ratchet member;
   a strap inserted through the first shaft and having a first portion and a second portion, both of which extend in opposite directions, the first shaft being rotatable to collect the first portion of the strap, the reeling device being rotatable to collect the second portion of the strap; and a ratchet wheel mounted on the first shaft, and a detent movably installed on the lever between an operative position, in which the detent engages the ratchet wheel in order to rotate the shaft, and an idle position, in which the detent is away from the first ratchet;

wherein engaging between the ratchet member and the pawl provides a step-by-step effect and facilitates collection of the second portion of the strap by preventing the second shaft from turning in a direction to unreel the strap;

wherein the detent comprises a retaining portion for engaging the ratchet wheel, two lateral strips extending toward the gripping portion from two sides of the retaining portion, and an operation portion located between the gripping portion and the second shaft and having two sides each connected with a distal end of one of the two lateral strips.

2. The tensioning apparatus as defined in claim 1, wherein the lever includes a pair of cams spaced from each other.

3. The tensioning apparatus as defined in claim 2, wherein the second shaft is installed between the cams.

4. The tensioning apparatus as defined in claim 2, wherein the first shaft is mounted between and interconnects the cams.

5. The tensioning apparatus as defined in claim 2, wherein the gripping portion is mounted between and interconnects the cams.

6. The tensioning apparatus as defined in claim 1, wherein the second shaft is disposed between the gripping portion and the detent.

7. The tensioning apparatus as defined in claim 1, wherein the reeling device comprises a handle connected to the second shaft for facilitating user to rotate the second shaft.

8. The tensioning apparatus as defined in claim 7, wherein the handle is composed of at least one knob and a grip, the knob being connected with an end of the second shaft and located outside a space between the two cams, the grip being mounted to the knob and spaced from an axis of the second shaft.

9. The tensioning apparatus as defined in claim 8, wherein the cam close to the handle comprises two lugs formed on a surface thereof; the grip is pivoted to the knob; when the grip pivots to hug the cam, the grip engages in a space between the two lugs.

10. The tensioning apparatus as defined in claim 1, wherein the second shaft comprises a slot for facilitating the second portion of the strap to be attached to the second shaft.

11. The tensioning apparatus as defined in claim 10, wherein the second shaft is plate-shaped.

12. The tensioning apparatus as defined in claim 11, wherein the second shaft comprises a predetermined width at each of two side of the slot.

13. The tensioning apparatus as defined in claim 1, wherein the ratchet member comprises a plurality of teeth; the pawl can engage in a space between two of teeth of the ratchet member and the pawl can disengage from the space and be biasably urged to engage in a space between another two of teeth of the ratchet member by the elastic element during rotation of the ratchet member.

14. The tensioning apparatus as defined in claim 1, wherein the pawl is operably moveable between a first position, in which the pawl engages the ratchet member, and a second position, in which the pawl disengages from the ratchet member; the second portion of the strap collected on the reeling device can be unreeled.

15. The tensioning apparatus as defined in claim 1, wherein the elastic element comprises a first end mounted on the lever, and a second end connected with the pawl.

16. The tensioning apparatus as defined in claim 1, wherein each of the lateral strips comprises a bended portion for circumventing the second shaft toward the gripping portion.

17. The tensioning apparatus as defined in claim 1, wherein the second portion of the strap collected on the second shaft is located between the two lateral strips.

* * * * *